Feb. 7, 1961 F. HONEYCUTT ET AL 2,970,874

EQUIPMENT UNITS

Filed May 21, 1958 3 Sheets-Sheet 1

INVENTORS
FRANK HONEYCUTT
ROBERT A. HUHN
ROBERT M. MYERS
CARL H. WILSON

BY F. D. Prager
ATTORNEY

Feb. 7, 1961 F. HONEYCUTT ET AL 2,970,874

EQUIPMENT UNITS

Filed May 21, 1958 3 Sheets-Sheet 2

INVENTORS
FRANK HONEYCUTT
ROBERT A. HUHN
ROBERT M. MYERS
CARL H. WILSON

BY F. D. [signature]
ATTORNEY

INVENTORS
FRANK HONEYCUTT
ROBERT A. HUHN
ROBERT M. MYERS
CARL H. WILSON
BY F. D. [signature]
ATTORNEY United States Patent Office 2,970,874

Patented Feb. 7, 1961

2,970,874

EQUIPMENT UNITS

Frank Honeycutt, Lakewood, Robert A. Huhn, Downey, Robert M. Myers, La Habra, and Carl H. Wilson, Long Beach, Calif., assignors to Philco Corporation, Philadelphia, Pa., a corporation of Pennsylvania Filed May 21, 1958, Ser. No. 736,807

4 Claims. (Cl. 312—223)

This invention has to do with office equipment and the like. It provides an equipment unit combining desk, file and control facilities in such a way that a plurality of operators using said unit can have access to and correlate a great variety of items of stored information in very rapid sequence.

The new unit is useful for instance in the performance of certain operations in the field of service and repair, wherein operators or clerks, while receiving service calls by telephone, must rapidly obtain and correlate available information pertaining to equipment to be serviced, and/or information relating to the availability and working schedules of servicemen. Although it is by no means limited to such utilization, the unit to be described herein has been found to be of outstanding advantage and success in said field; it will therefore be explained as applied to such specific purposes as have been indicated.

It is a primary object of the invention to provide a unit of the type referred to which facilitates and accelerates the proper access to and correlation of various types of information. It is a particular object to provide such a unit which allows utilization of two, three or more sources of available information, provided for instance by telephone service and/or by various groups of files; which can be used by a group of clerks stationed in a suitably limited work area; which minimizes delay and effort; and which uses mechanism and controls of great economy and reliability. Other objects and features of the invention will appear from the description which follows.

Briefly described, the new unit comprises desk and file means movable relative to one another by power from a suitable source, under the control of circuitry including switches installed in various work areas of the desk means. Desirably, a plurality of superposed, independently rotatable file sections or systems are provided, centrally of an annular desk plate. It is further preferred to use a control combination including hand and foot switches at each work area; and the invention provides other specific arrangements of parts, as will best be explained in connection with the detailed description of a preferred embodiment, which follows.

Figure 1:
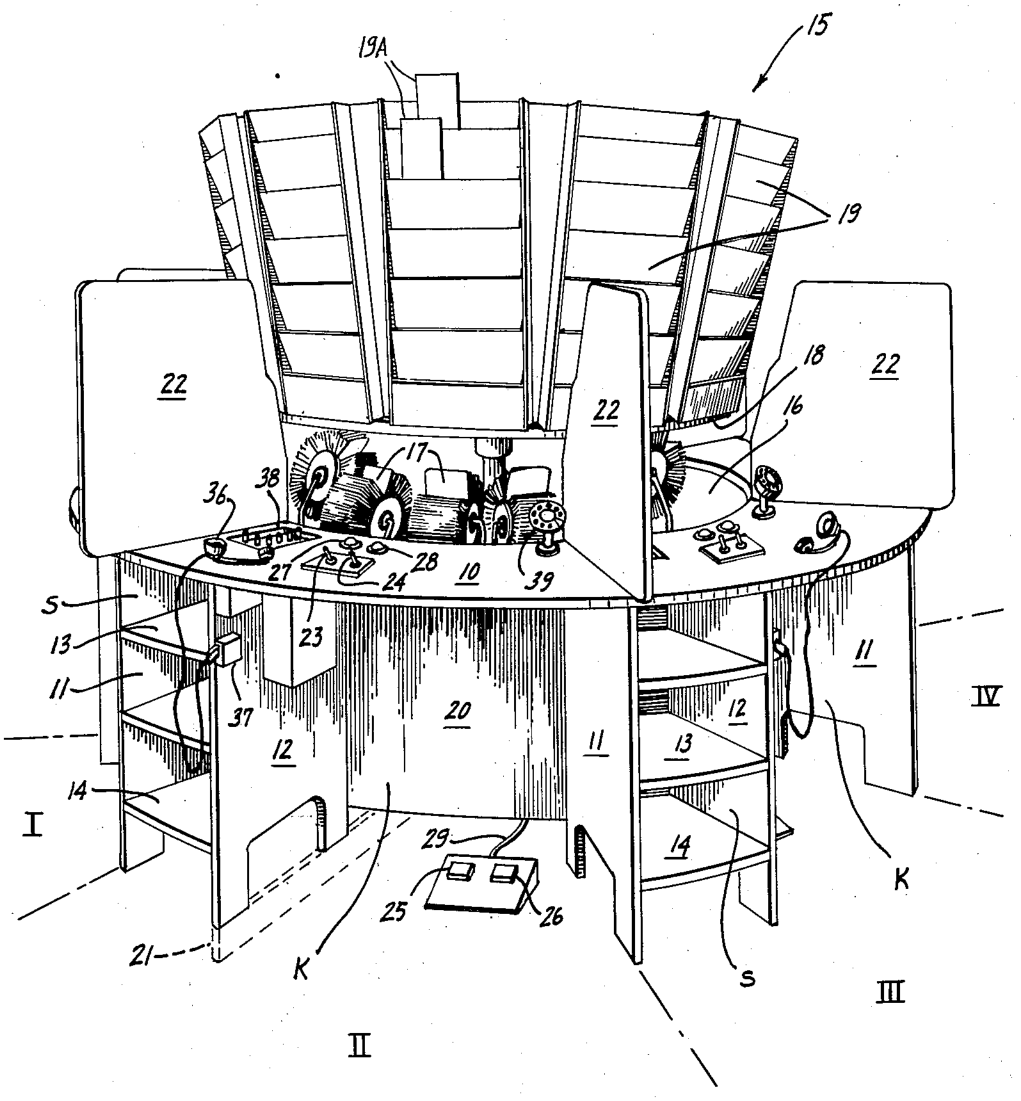
Figure 2:
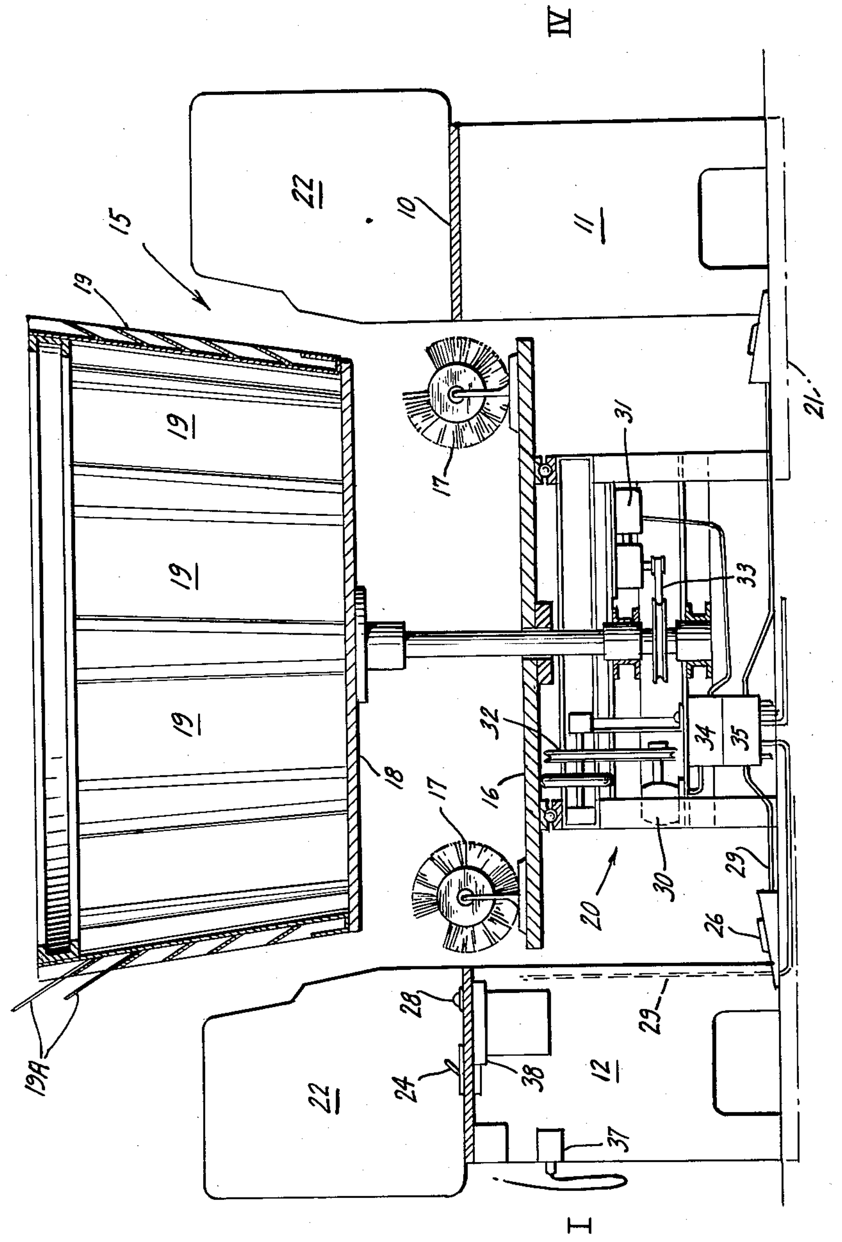
Figure 3:
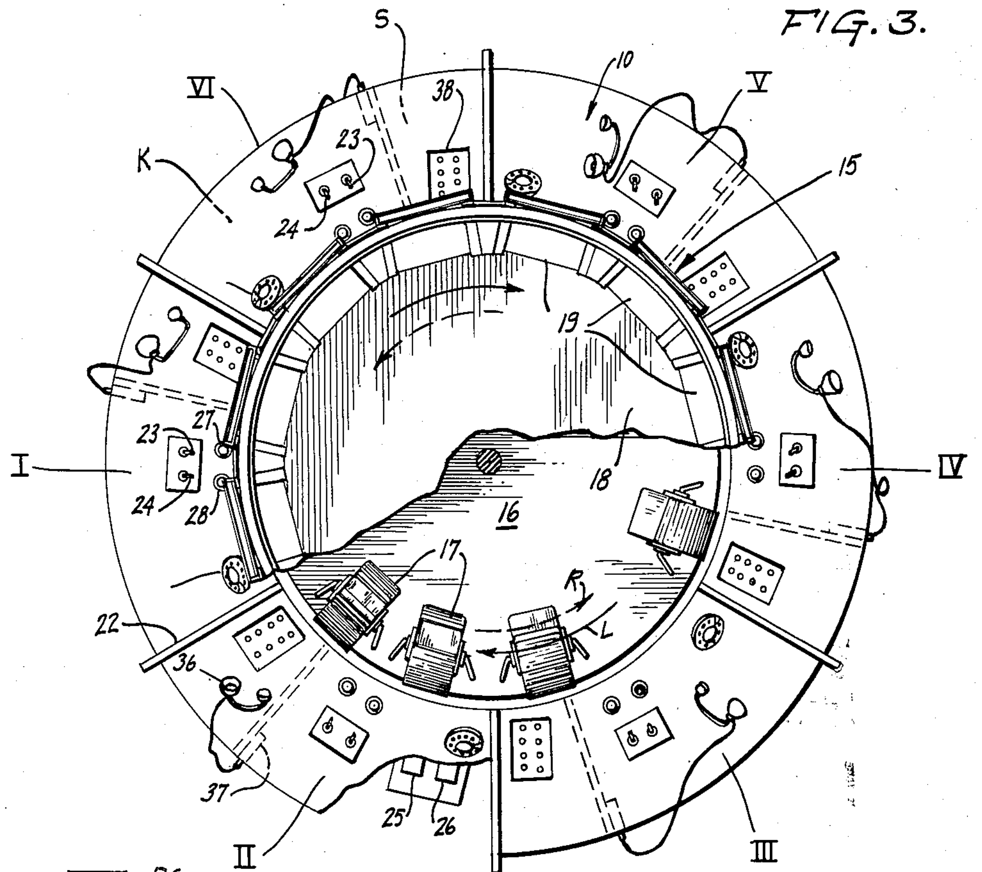
Figure 4:
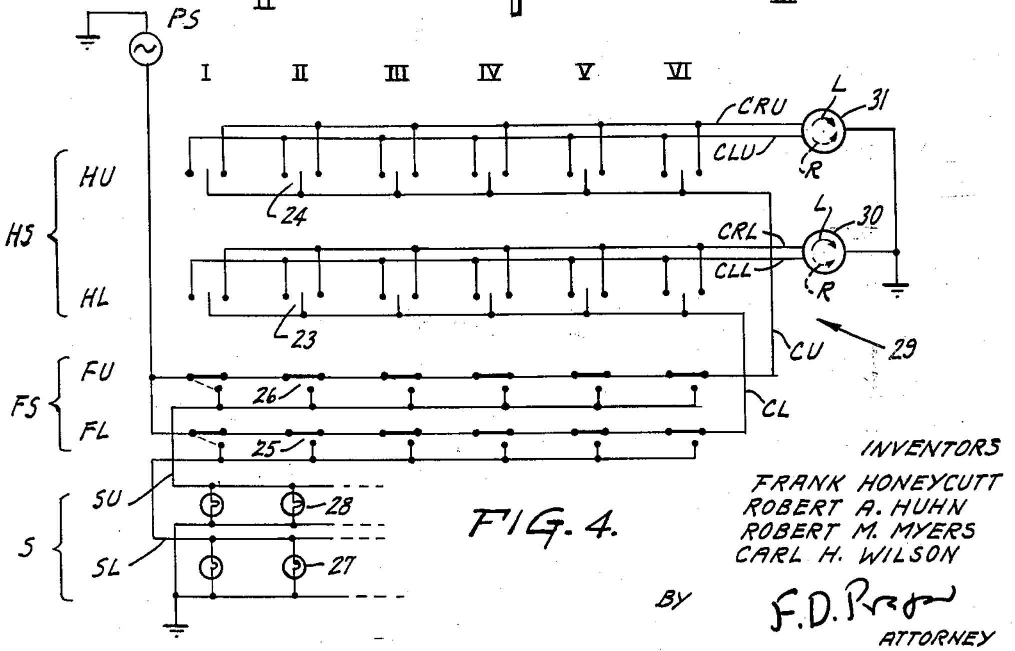

In the drawing appended hereto: Figure 1 is a perspective view of the new desk and file unit; Figure 2 is an elevational view of said unit, substantially taken in central, vertical section and on a slightly larger scale; Figure 3 is a plan view of said unit on the approximate scale of Figure 1; and Figure 4 is a wiring diagram showing representative electrical interconnections of portions of said unit.

Referring first to Figure 1, the device comprises an annular stationary desk plate 10, shown as resting on radially disposed wall members 11, 12. Said wall members define storage compartments S for stationery or the like, alternating with knee spaces K, so that each of a group of clerks, seated around the annular desk in work areas I, II, III, etc., is provided with knee space K next to a storage compartment S. The latter compartments are shown as having horizontal shelf and bottom members 13, 14 therein.

Coaxially and centrally of annular plate 10, a circular rotary desk apparatus 15 is provided, which preferably includes a first rotary platform 16 disposed at a level below the stationary plate 10, for the support of records such for example as card files 17, and a second rotary platform 18 disposed above said card files, for the support of other data, in this instance ticket racks 19. The entire rotary apparatus is pivotally supported by a structure 20, which is rigidly secured to the walls or supports 11 or 12 surrounding it, by structural means 21 desirably installed below the floor. Vertical partitions 22 are provided on desk plate 10, between work areas I, II, III, etc.

Each of said work areas has a pair of rotation-initiating hand switches 23, 24, mounted on desk plate 10, a pair of rotation-preventing foot switches 25, 26 mounted below said plate, and a pair of interlock indicating signal lamps 27, 28 controlled by the foot switches and mounted opposite the hand switches. The various switches and lamps are interconnected by circuitry including conductors 29; and said conductors, as shown in Figure 2, extend to a pair of reversible motors 30, 31 mounted on the central structure 20, each motor being adapted by suitable transmission means 32, 33 to rotate one of the central platforms or turntables 16, 18. The motors are connected with said circuitry 29 through a relay box 34 which in turn is associated with an outlet receptacle 35.

Each work area, as shown in Figure 1, is also provided with telephone equipment, that is, an earphone-microphone unit 36, socket and switchboard means 37, 38 and dialing means 39, whereby the operator occupying the work area can receive incoming calls and, if necessary, hold such calls, or route them to other opertators, or make outgoing calls.

The operation of the new unit or system will be described as applied to the routing of service requests from various customers to various servicemen with respect to various items of equipment such as refrigerators, television units and other appliances. For such operation, card files 17 desirably contain warranty cards; each card recording an individual appliance unit, together with information such as the date of delivery, any date of previous service, and the like; and each file 17 desirably contains cards relating to one type of appliance. Ticket forms for issuing instructions to service personnel are advantageously stored in compartments S, for subsequent completion by the clerks in work areas I, II, etc., insertion by them in ticket file racks 19 as shown at 19A, and ultimate utilization by said clerks or by others who may remove such tickets at proper moments for further reference to the information thereon.

Assuming that the clerk occupying work area II (Figure 1) receives a service call through her switchboard 38 and earphones 36, and that the customer making the call requires service with respect to a certain type or model of refrigerator, the clerk can refer to the corresponding card file 17 by turning the first hand switch 23 to one side, for instance the left side (Figure 4), thereby closing a circuit from a power source PS through one set of foot switches FL, bus wire CL, switch 23, control wire CLL and motor 30, which initiates rotation of said motor 30, thereby moving the lower turntable. When having thereby secured the proper card file 17, in proper position, the clerk can then insure undisturbed use of said file by depressing foot switch 25, forming part of a series FL of such switches, in work area II, which interrupts the aforementioned circuit and thereby stops rotation of motor 30 for said lower turntable; the de-energization of a suitable motor being effective also to brake and stop the turntable itself. This foot switch operation also causes one signal indicator lamp 27 at each work area I, II, III, etc. to be energized, by closing a circuit from power source PS through switch 25 and signal bus wire SL, thereby indicating to all operators that none of the hand switches 23, for rotation of the lower turntable, can at this time be effectively operated.

During the call received through telephone 36 the clerk at work area II will generally determine the residential area of the customer making the call; and in order to route necessary orders to the corresponding serviceman, she will initiate independent rotation of the upper turntable and rack system 18, 19 by turning hand switch 24, for instance to the right, closing a circuit

PS—FU—CU—24—CRU—31

This makes available carded or ticketed information 19A showing the availability and service load of personnel in the various service areas. Ordinarily a selected serviceman can then be notified for instance by separate telephone call, at a time suitable to his work, and information from a series of tickets 19A can then be given to him.

Prior to such further telephone call or calls the clerk will, in most cases, at least temporarily stop the rotation of file system 18, 19, previously initiated by the same clerk. For this purpose she can operate the corresponding foot switch 26, closing of a circuit PS—26—SU—28 and thus causing the appearance of appropriate signals at lamps 28. At this time she will have released the formerly depressed foot switch 25, thereby releasing the lower turntable for use by other operators, and by the same operation also indicating this latter release to all operators, i.e., extinguishing the previously lighted set of signal lamps 27.

Upon the completion of a call from a customer, or to a serviceman, relating to a service request, a clerk should generally discontinue further rotation of either file system 16, 18; but at this time she should not generally interfere with such rotation by other clerks, who may then be in need of some sections of either file system. At this time, accordingly, the clerk will return her hand switches HS to normal or central position and release her foot switches FS, thereby breaking the file-rotating and file-stopping circuits, described above.

It will now be appreciated that the system as described provides a considerable degree of flexibility, largely by means of the hand switches HS, foot switches FS, and signal lamps S. At no time is it necessary for the operator whose work has been described, or for any other operator, to leave her work area, not even for instance in order to consult or use widely separated files 17 and/or 19. In addition, a most efficient sequence of referrals to different file systems can be used. For instance, should the lower-file signal lamp 27 be lighted at a time when a service call is received in area III, the clerk in said area can start her work by turning upper-file hand switch 24, opposite the unlighted upper-file signal lamp 28, thus using first the upper-file platform 18 and only later resorting to the lower one, which is then likely to have been released. This possibility provides substantial advantages by itself, independently of other features described herein.

Furthermore, excellent use can be made of the reversibility of motors 30, 31. A somewhat experienced operator is able during each service call to determine, from file indicia and the like, whether the required portion of the upper or lower file system 17, 19 happens to be relatively close to her right hand, or closer to her left hand. Depending on such determination she can turn her hand switches 23, 24 either to the right or to the left, thereby causing turntable rotations in the corresponding directions as seen by the operator. She may for instance use rightward rotation of files 17 but leftward rotation of ticket racks 19; see the broken line arrows R and the full line arrows L in Figures 3 and 4. Utilization of this expedient brings all of the stored file information almost instantly to hand, thereby contributing to a particularly prompt way of handling each incoming call even in case of a heavy load of such calls. This is important particularly when use is made of motors 30, 31 and transmission means 32, 33 (Figure 2) which avoid excessive rotational speed of the files in order to avoid undesirable vibration of mechanical parts and disturbance of papers.

It will be seen from the foregoing description that successive relative orienting and re-orienting motions of three or more unit sections or structures 10, 16, 18 can thus be performed, indicated, and controlled, in rapid succession, by the several clerks occupying the work areas, with no mutual interference, with a minimum of delay, and with substantially no loss of time by clerks getting up and walking to different file areas.

It will finally be noted, when once more referring to Figure 4, that the multiple, mutually orienting and re-orienting operations of the different unit sections or structures are controlled by electrical equipment of great simplicity. All hand and foot switches HS, FS, as shown, are desirably of single pole, double throw type. All foot switches FS are normally closed in their upper or bus wire connecting positions, whereas the poles of all hand switches HS are normally in neutral or central positions. It will also be appreciated that modifications can readily be made, if desired. For instance, the showing of the relay and motor units 30, 31 in Figure 4 is of course very simplified; various well-known refinements can be incorporated therein, for instance, interposition of relays 34 (Figure 2) between motors 30, 31 and control buses CRU, CLU, CRL, CLL (Figure 4) in order to avoid trouble in cases such as that of accidental, simultaneous operation of two different hand switches 23, calling for conflicting, rightward and leftward rotations of one part 30 of the motorized system.

While only a single embodiment of the invention has been described, it should be understood that the details thereof are not to be construed as limitative of the invention, except insofar as is consistent with the scope of the following claims.

We claim:

1. Apparatus for storage and utilization of data, comprising a plurality of storage desk portions, each providing a plurality of storage sections distributed along marginal portions of said storage desk portions; mounting means holding said several storage desk portions for rotation in mutually superposed horizontal planes; power means for independently rotating said desk portions, in their respective horizontal planes, one relative to another; a rigid work desk portion confronting said rotatable storage desk portions and providing a plurality of work areas distributed along said marginal portions of said rotatable storage desk portions; and switch means in each work area, adapted to energize the power means for independently rotating each of said rotatable storage desk portions and to de-energize such power means for independently stopping each rotatable storage desk portion.

2. Apparatus as described in claim 1 wherein said power means comprises a plurality of reversible motors, one for actuating each of said rotatable desk portions; said switch means comprising a separate switch in each work area for the control of each of said motors, each separate switch being adapted to selectively actuate, reverse and stop the corresponding motor.

3. Apparatus for storage and utilization of data comprising a plurality of mutually superposed storage desk portions having approximately circular form as seen from the top, each of said portions providing a plurality of storage sections distributed along peripheral portions thereof; mounting means holding said several storage desk portions for rotation in horizontal planes; power means for independently horizontally rotating said storage desk portions, one relative to another; annular desk and cabinet means surrounding at least a lower one of said storage desk portions and providing a plurality of work areas distributed along said peripheral portions of the storage desk portions; and switch means in each of said work areas, adapted to energize the power means for rotating each of said rotatable storage desk portions and to de-energize such power means for stopping each of said rotatable storage desk portions.

4. Apparatus as described in claim 3 wherein said annular desk and cabinet means comprises an annular desk plate mounted at an elevation slightly above the lowermost one of said rotatable desk portions.

References Cited in the file of this patent

UNITED STATES PATENTS

| | | |
|---|---|---|
| 1,183,114 | Ramsell et al. | May 16, 1916 |
| 2,314,705 | Johnson | Mar. 23, 1943 |
| 2,412,270 | Johnston | Dec. 10, 1946 |
| 2,504,629 | Bertello | Apr. 18, 1950 |
| 2,633,398 | McAllister | Mar. 31, 1953 |
| 2,647,022 | Smid | July 28, 1953 |
| 2,659,646 | Attwood | Nov. 17, 1953 |
| 2,688,525 | Lindstrom | Sept. 7, 1954 |
| 2,705,181 | Nye | Mar. 29, 1955 |
| 2,729,531 | Andersen | Jan. 3, 1956 |
| 2,888,306 | Sease | May 26, 1959 |